T. S. SMITH.
Malt Drier.
No. 27,237.
Patented Feb. 21, 1860.
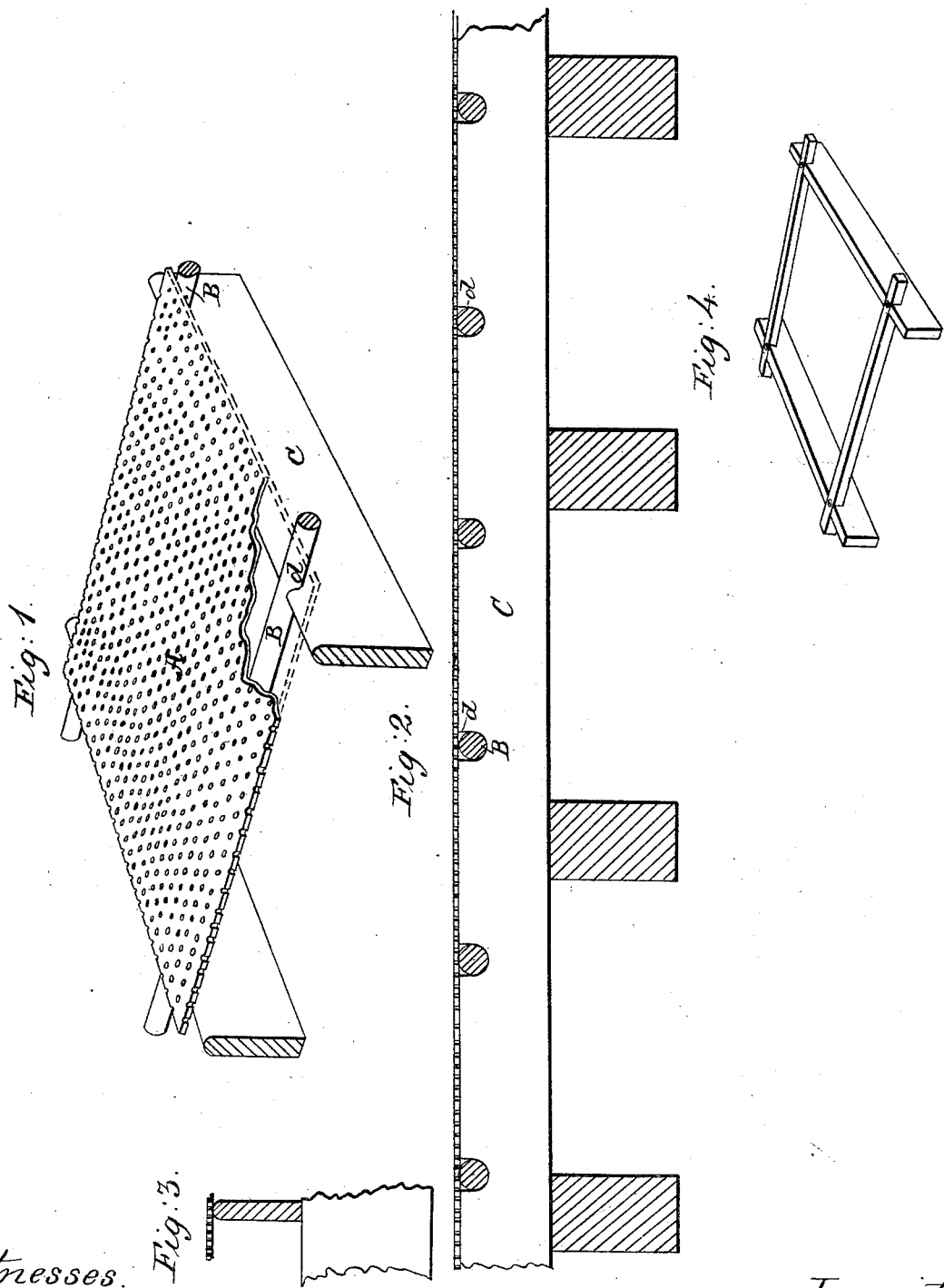
Witnesses.
Inventor.

UNITED STATES PATENT OFFICE.

THOMAS S. SMITH, OF CINCINNATI, OHIO.

FLOOR OF MALT-KILNS.

Specification of Letters Patent No. 27,237, dated February 21, 1860.

*To all whom it may concern:*

Be it known that I, THOMAS S. SMITH, of Cincinnati, in the county of Hamilton and State of Ohio, have invented a new and useful Improvement in Floors for Malt-Kilns; and I do hereby declare that the following is a full, clear, and exact description thereof, reference being had to the accompanying drawings and to the letters of reference marked thereon and made to form a part of this specification.

My improvement relates to the construction of malt kilns, and it has for its object to expose the malt to an equal action of heat throughout its whole mass, so as to be uniformly affected by it.

The nature of my improvement consists in combining with a perforated plate a peculiarly constructed and arranged supporting frame, so as to enable the current of heated air to pass upward and spread itself uniformly over the whole surface of the perforated plate upon which the malt is made to rest; whereby each particle of malt is exposed to an equal and regular action of the heat.

What I claim as new and desire to secure by Letters Patent is—

In combination with the perforated plate (A) the tesselated frame work (C, B) the upper edges of which are rounded as described; the whole being arranged in the manner as set forth, for the purpose of enabling the heated air to pass equally upward through the perforated plate, there being no obstructing surface under the said perforated plate.

In testimony of which invention I have hereunto set my name.

THOS. S. SMITH.

Witnesses:
H. E. CLIFTON,
D. O. PAIGE.